W. D. STOCKLY.
WHEEL CONNECTOR FOR TUBULAR AXLES.
APPLICATION FILED JAN. 20, 1914.
1,108,809.
Patented Aug. 25, 1914.
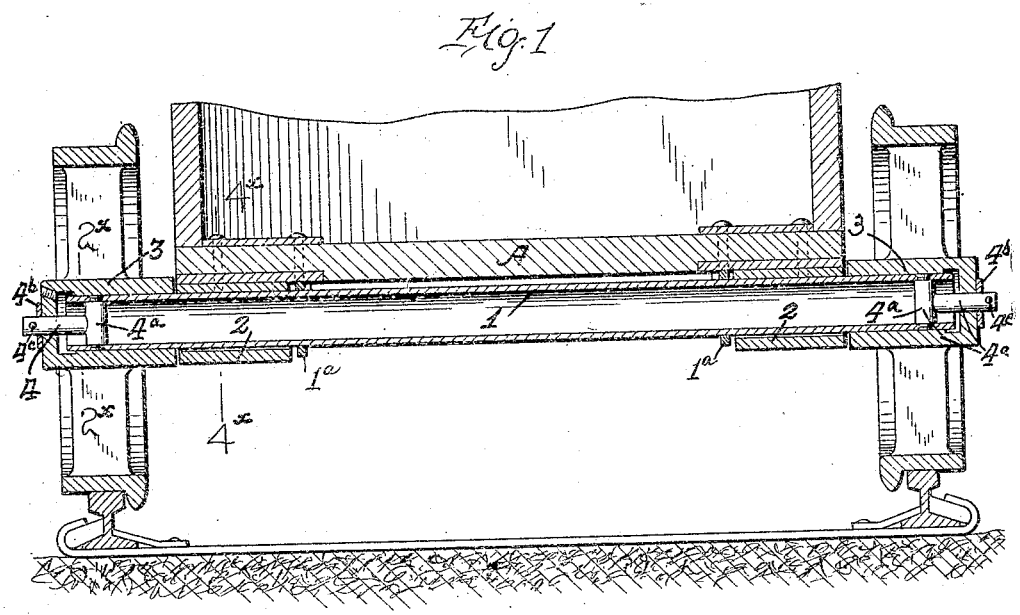
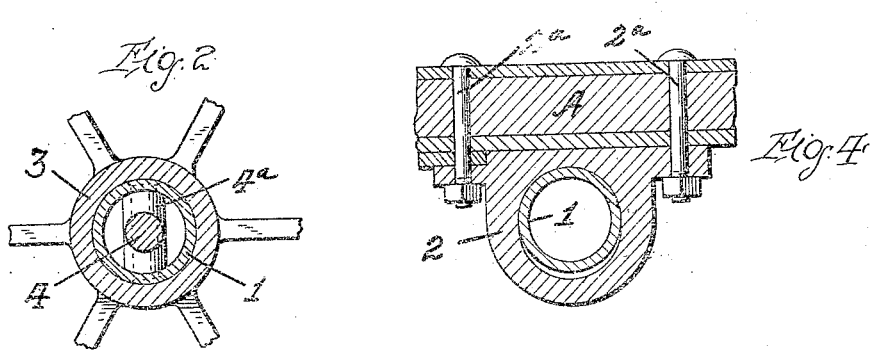
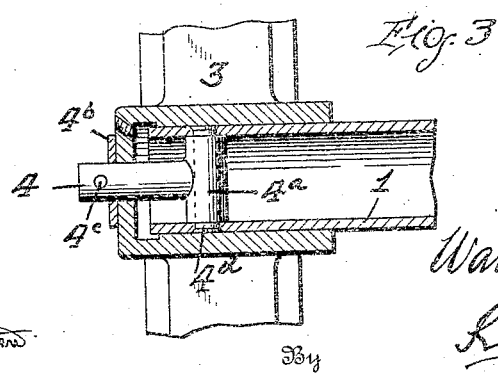
Witnesses
Robert M. Sutphen
William H. Knight
Inventor
Walter D. Stockly
By Knight Bros
Attorneys

UNITED STATES PATENT OFFICE.

WALTER D. STOCKLY, OF FAIRMONT, WEST VIRGINIA, ASSIGNOR TO MINING APPLIANCES COMPANY, A CORPORATION OF WEST VIRGINIA.

WHEEL-CONNECTOR FOR TUBULAR AXLES.

1,108,809.

Specification of Letters Patent. Patented Aug. 25, 1914.

Application filed January 20, 1914. Serial No. 813,246.

*To all whom it may concern:*

Be it known that I, WALTER D. STOCKLY, a citizen of the United States, residing at Fairmont, in the county of Marion and State of West Virginia, have invented certain new and useful Improvements in Wheel-Connectors for Tubular Axles, of which the following is a specification.

This invention relates to means for retaining wheels upon tubular axles which do not project through the wheels and has for its object to provide a simple and durable means for connecting each wheel independently of the other, in a construction of the type referred to.

In a device of this kind it is desirable to have the connecting means of such nature that it will not interfere with the rotation of the wheel upon the axle, besides allowing some freedom of relative axial movement between the wheel and axle and avoiding interference with the use of the bore of the axle as a reservoir for lubricant. The problem is solved in a manner to conserve these several considerations, by the device disclosed in the accompanying drawings and described in the following specification.

In said drawings:—Figure 1 is a vertical axial section showing the improved construction; Fig. 2 is a section on the line $2^x$—$2^x$, Fig. 1; Fig. 3 is a detail view corresponding to a portion of Fig. 1 but on a larger scale, and Fig. 4 is a section on the line $4^x$—$4^x$ of Fig. 1.

1 represents the car axle which is connected with the car body A by a suitable means such as the clip or bearing 2, secured by bolts $2^a$ and which is constructed to permit slight axial and rotary movement of the axle 1; the rotary movement being such as is developed from time to time by the friction of the wheels and the axial movement being only such as is permitted by the clearance between the end of the axle and the closed end of the wheel hub, or by the limiting collars $1^a$ which are suitably fixed upon the axle.

The wheels 3 have closed outer ends so that they form the end closures for the tubu-
lar reservoir of the axle and they are limited in outward movement on the axle, by means of central pins 4 which project through the closed ends of the wheel hubs and receive a suitable securing device such as washers $4^b$ and cotter pins $4^c$. The central pins 4 are independently connected with the axle through means of T heads $4^a$ which fit diametrically within the ends of the axle and are there secured by through pins $4^d$ which are headed in the cylindrical walls of the axle and finished smooth with the bearing surface of the axle. The wheels will be confined mainly by their flanged bearings against the rails on which they run and the rails will thus afford the chief resistance to the lateral thrust of the car body, as well as the thrust of the axle as it impinges against the closed end of the wheel hub. The means for securing the wheel upon the axle will serve its purpose only in the event that abnormal conditions develop.

What I claim is:—

1. In combination with an open end tubular axle and closed-end wheels fitted thereon, means for securing the wheels against displacement from the axle while permitting both wheels to rotate and move axially with relation to the axle and to each other; said means comprising independent pins projecting centrally from the open ends of the axle and through the closed-ends of the hubs, each pin having independent means for securing it within the bore of the axle without closing the open end.

2. In combination with a tubular axle, wheels mounted to rotate on the ends thereof and constructed with closed hubs; said axle having longitudinal movement in said wheels; independent means for securing each wheel to the axle comprising pins projecting centrally from the ends of the axle and through the closed hubs, and T heads on said pins secured diametrically in the bore of the axle.

3. In combination with a tubular axle, wheels mounted to rotate on the ends thereof and constructed with closed hubs; said axle having longitudinal movement in said wheels, independent means for securing each wheel to the axle comprising pins projecting centrally from the ends of the axle and through the closed hubs, and T heads on said pins fitting the bore of the axle, and rivets projecting from said T heads and into the walls of the axle.

The foregoing specification signed at Fairmont, W. Va., this 7th day of January, 1914.

WALTER D. STOCKLY.

In presence of two witnesses:
J. C. EVANS,
B. MASSEY.